US012608707B1

(12) United States Patent
Arrante et al.

(10) Patent No.: US 12,608,707 B1
(45) Date of Patent: Apr. 21, 2026

(54) SYSTEM AND METHOD TO PROVIDE A PLATFORM FOR FULL-AMOUNT TRANSACTIONS

(71) Applicant: Cboe Exchange, Inc., Chicago, IL (US)

(72) Inventors: James Arrante, Chicago, IL (US); Rylan Uherek, Franklin Park, NJ (US)

(73) Assignee: Cboe Exchange, Inc., Chicago, IL (US)

( * ) Notice: Subject to any disclaimer, the term of this patent is extended or adjusted under 35 U.S.C. 154(b) by 0 days.

(21) Appl. No.: 18/218,711

(22) Filed: Jul. 6, 2023

Related U.S. Application Data

(60) Provisional application No. 63/359,550, filed on Jul. 8, 2022.

(51) Int. Cl.
G06Q 20/40 (2012.01)
(52) U.S. Cl.
CPC ......... G06Q 20/401 (2013.01); G06Q 20/405 (2013.01)
(58) Field of Classification Search
None
See application file for complete search history.

(56) References Cited

U.S. PATENT DOCUMENTS

| | | | | | |
|---|---|---|---|---|---|
| 8,655,765 | B1* | 2/2014 | Gastineau | .............. | G06Q 40/06 705/37 |
| 10,726,479 | B2* | 7/2020 | Bauerschmidt | ........ | G06Q 40/00 |
| 2001/0049651 | A1* | 12/2001 | Selleck | .............. | G06Q 30/0601 705/26.1 |
| 2005/0102219 | A1* | 5/2005 | Taylor | ................ | G06Q 30/0283 705/37 |
| 2007/0288342 | A1* | 12/2007 | Maclin | ................... | G06Q 40/04 705/37 |
| 2008/0137532 | A1* | 6/2008 | Namburi | ............... | H04W 24/04 370/225 |
| 2012/0143742 | A1* | 6/2012 | Doherty | ................ | G06Q 40/04 705/37 |
| 2012/0246052 | A1* | 9/2012 | Taylor | ................... | G06Q 40/06 705/37 |
| 2014/0025552 | A1* | 1/2014 | Hirani | ................... | G06Q 40/04 705/37 |
| 2015/0081504 | A1* | 3/2015 | Janas | ..................... | G06Q 40/04 705/37 |

(Continued)

*Primary Examiner* — William J Jacob
(74) *Attorney, Agent, or Firm* — Fish & Richardson P.C.

(57) ABSTRACT

An exchange computer system for multicast communication on an exchange network, the computer system comprising: at least one communication interface configured to bridge communication between liquidity providers and at least one liquidity consumer; and a trading engine configured to perform operations of: receiving liquidity offers from liquidity providers having a range of transaction sizes; establishing a series of liquidity pools for the liquidity offers, each liquidity pool corresponding to a transaction size; filtering the liquidity offers in each liquidity pool such that a top-of-the-book offer from each liquidity pool is streamed to the at least one liquidity consumer using the multicast communication; in response to matching a transaction request with a liquidity offer, executing a transaction; and in response to executing the transaction, updating the liquidity pool accordingly so that data from the updated liquidity pool is streamed to the at least one liquidity consumers using the multicast communication.

20 Claims, 7 Drawing Sheets

(56) References Cited

U.S. PATENT DOCUMENTS

| | | | |
|---|---|---|---|
| 2017/0103462 A1* | 4/2017 | Peck-Walden | G06Q 40/04 |
| 2017/0124649 A1* | 5/2017 | Schonberg | G06Q 40/04 |
| 2020/0364791 A1* | 11/2020 | Taylor | G06N 20/00 |
| 2023/0289791 A1* | 9/2023 | Zarick | G06Q 20/403 |
| 2024/0104585 A1* | 3/2024 | Singh | G06Q 30/0201 |
| 2025/0272724 A1* | 8/2025 | Cella | G06N 3/088 |

* cited by examiner

| Bid Size | Best Bid |
|----------|----------|
| 1M | 98.37500 |
| 2M | 98.34375 |
| 3M | 98.28125 |
| 4M | 98.28125 |
| 5M | 98.25000 |
| . . . | . . . |

ESTABLISH A QUEUE
610

TOP-OF-THE-BOOK
CHANGED?
620

Y

MODIFY THE QUEUE 630

LAST OFFER REMOVED?
640

Y

CLEAR THE QUEUE
650

SYSTEM AND METHOD TO PROVIDE A PLATFORM FOR FULL-AMOUNT TRANSACTIONS

CROSS-REFERENCE TO RELATED APPLICATION

This application claims the benefit of U.S. Provisional Patent Application No. 63/359,550 filed Jul. 8, 2022, which is incorporated herein by reference in its entirety.

TECHNICAL FIELD

This application relates to technology for real-time data processing on an electronic exchange network.

BACKGROUND

A modern electronic exchange network can handle high-volume of information and high-speed of information exchange to support real-time trading of financial instruments such as derivatives, stocks, and bonds. The electronic exchange network may operate, for example, the FIX (Financial Information exchange) protocol, or variants adapted for streaming data to facilitate high-speed electronic communication for electronic trading and other activities. In many cases, a high-speed exchange network can process millions of streaming messages per second during peak trading periods.

SUMMARY

A high-speed electronic exchange network can carry millions of communication messages per second for conducting transactions. For sophisticated market participants, such as dealers, time is of essence when submitting transaction orders on the high-speed electronic exchange network. For example, it would have been advantageous for a transaction request from a market participant to be matched to the best offer from a party providing the counter liquidity at the first available opportunity. Once the best match has been identified, in certain circumstances, it may be advantageous to execute the transduction as soon as possible. Moreover, it would be advantageous to achieve matching and execution with efficiency, for example, with significantly reduced communication latency.

Implementations of the present disclosure can provide a platform to achieve the desirable features. First, the platform operates a specially tuned messaging protocol so that a liquidity consumer (LC), e.g., a party offering bids, may only receive and access quotes, in a streaming manner, from a unique subset of liquidity providers (LPs), e.g., parties offering liquidities. For example, quotes may be provided by LPs in pre-determined notional size tiers, typically in size intervals of 5-to-10 million, up to 100 million or so. For each notional size quoted, only the top-of-book offer is streamed so that the LC may see the best bid and/or best offer in a given notional size tier. Additionally, the messaging protocols can carry payload data in a binary format with fixed-length data fields so that data transmission efficiency can be potentially maximized and communication latency can be potentially minimized. These adaptations to the communication protocol on the electronic exchange network allow for a transaction request from the market participant to be matched to the best counter liquidity available from counterparty at the first available opportunity.

Second, the platform operates a full-amount-style protocol for matching and execution where each aggressing order received by the platform has a minimum fill size equivalent to the full notional amount of the aggressing order so that matching is enforced to be at the full amount of the aggressing order. For example, a transaction request from an LC for a liquidity can only match and execute against a single quote with sufficient amount to cover the full notional amount and from a single LP. Thus, the transaction request from the LC may not be matched to multiple quotes for the counter liquidity. In other words, the LC may not sweep an order book on the platform to cover one transaction request. On this platform, all aggressing orders sent to the matching engine have an immediate or cancel time-in-force with a limit price so that an aggressing order from a LC that fails to match an existing quote may not enter into a queue for future matching/execution in the order book. The no-match can be caused by, for example, cancellation of the quote, or the quote becoming otherwise unavailable. If this happens, the order that fails to match will be dropped. Using this full-amount feature, the platform allows the transaction request from the LP to be matched to a single quote and then consummated in a single transaction, thereby facilitating a full-amount-style operation in one step with no additional spreads.

Third, the platform implements a multicast data exchange network which has no human equivalent. The multicast data exchange network incorporates data structures and communication protocols adapted for efficient utilization of network bandwidth and computational resources. For example, the platform implements, on the multicast data exchange network, a series of distinct liquidity pools for the respective notional sizes where the quotes provided by providers (e.g., LPs) are selectively filtered so that, for each notional size, only the top-of-the-book bid/ask price is streamed to a market participant (e.g., an LC). By incorporating a data structure that removes non-top candidates in each pool from further streaming, the platform can effectively reduce communication overhead during a multicast communication session so that the top-of-the-book offerings from the providers can be projected continuously and dynamically to each participant, as transactions are conducted on the electronic exchange network. By implementing a distinct pool for each notional size, the platform can allow a transaction request of a given size to be efficiently queued for matching. Once a matching liquidity has been identified, the platform allows a single transaction in which the full amount of the transaction request is satisfied. The full-amount single-transaction feature also reduces communication overhead in addition to optimizing computational resources. As described in more detail below, the exchange computer system can dynamically, efficiently, and continuously provide these salient features to a participant, allowing real-time transactions conducted through an interactive user-computing device of the participant.

In one aspect, implementations provide an exchange computer system configured to provide a multicast mode of communication to participants on an exchange network, the exchange computer system comprising: at least one communication interface configured to bridge communication between computing devices of a plurality of liquidity providers and at least one user-computing device of at least one liquidity consumer; a trading engine comprising at least one hardware processor coupled to at least one non-transitory computer-readable medium, wherein the at least one non-transitory computer-readable medium stores computer-executable instructions that, when executed by the at least one hardware processor, cause the trading engine to perform operations comprising: receiving data encoding liquidity offers from the plurality of liquidity providers, the liquidity offers having a range of transaction sizes; establishing a data structure encoding a series of liquidity pools for the liquidity offers from the plurality of liquidity providers, each liquidity pool corresponding to a transaction size from the range of transaction sizes; filtering the liquidity offers in each liquidity pool such that a top-of-the-book offer from each liquidity pool is streamed to the at least one liquidity consumer using the multicast mode of communication; receiving transaction requests from the at least one liquidity consumer, wherein each transaction request includes a transaction price and a transaction size; in response to matching a transaction request from the at least one liquidity with a liquidity offer in a liquidity pool, executing a transaction against the liquidity offer in the liquidity pool, wherein the liquidity pool fits the transaction size of the transaction request and the liquidity offer meets the transaction price of the trans-action request; and in response to executing the transaction, updating the liquidity pool accordingly so that data from the updated liquidity pool is streamed to the at least one liquidity consumers using the multicast mode of communication.

The implementations may include one or more of the following features.

The data structure may include a plurality of queues each encoding liquidity offers of a respective transaction size. The operations may further include: in response to receiving a liquidity offer of a particular size and determining that no liquidity offer of the particular transaction size has been earlier received, generating a "New" event so that a particular queue is created for the particular transaction size. The operations may further include: in response to determining that a last liquidity offer for the particular transaction size is being removed, generating a "Cancel" event so that the particular queue for the particular transaction size is cleared. The operations may further include: in response to determining that the top-of-the-book offer of the particular queue has changed, generating a "Modify" event so that the changed top-of-the-book offer of the particular queue is streamed to the at least one liquidity consumer using the multicast mode of communication. Matching the transaction request may include: comparing the top-of-the-book offer from more than one queues. The transaction may be executed in full without breaking up the transaction request. The liquidity pool may have a transaction size that is no smaller than the transaction size of the transaction request. The operations may further include: dropping a transaction request from the at least one liquidity consumer when the transaction request from the at least one liquidity consumer remains unmatched with a liquidity offer in a liquidity pool within a time-out period, wherein the time-out period is selected by the liquidity consumer. The multicast mode of communication may operate a messaging protocol in which each message has fixed-length fields in binary format. The operations may further include: assigning the range of transaction sizes upon receiving the data encoding the liquidity offers. Each liquidity pool comprises at least one liquidity offer at an offered transaction price and at the corresponding transaction.

In another aspect, implementations provide a computer-implemented method that includes: receiving data encoding liquidity offers from a plurality of liquidity providers, the liquidity offers having a range of transaction sizes; estab-lishing a data structure encoding a series of liquidity pools for the liquidity offers from the plurality of liquidity pro-viders, each liquidity pool corresponding to a transaction size from the range of transaction sizes; filtering the liquidity offers in each liquidity pool such that a top-of-the-book offer from each liquidity pool is streamed to at least one liquidity consumer using the multicast mode of communication; receiving transaction requests from the at least one liquidity consumer, wherein each transaction request includes a trans-action price and a transaction size; in response to matching a transaction request from the at least one liquidity with a liquidity offer in a liquidity pool, executing a transaction against the liquidity offer in the liquidity pool, wherein the liquidity pool fits the transaction size of the transaction request and the liquidity offer meets the transaction price of the transaction request; and in response to executing the transaction, updating the liquidity pool accordingly so that data from the updated liquidity pool is streamed to the at least one liquidity consumers using the multicast mode of communication.

The implementations may include one or more of the following features.

The data structure may include a plurality of queues each encoding liquidity offers of a respective transaction size. The method may further include: in response to receiving a liquidity offer of a particular transaction size and determin-ing that no liquidity offer of the particular transaction size has been earlier received, generating a "New" event so that a particular queue is created for the particular transaction size. The method may further include: in response to deter-mining that a last liquidity offer for the particular transaction size is being removed, generating a "Cancel" event so that the particular queue for the particular transaction size is cleared. The method may further include: in response to determining that the top-of-the-book offer of the particular queue has changed, generating a "Modify" event so that the changed top-of-the-book offer of the particular queue is streamed to the at least one liquidity consumer using the multicast mode of communication. Matching the transaction request may include comparing the top-of-the-book offer from more than one queues. Executing the transaction against the liquidity offer in the liquidity pool may include: executing the transaction in full without breaking up the transaction request. The liquidity pool may have a transac-tion size that is no smaller than the transaction size of the transaction request. The method may further include: drop-ping a transaction request from the at least one liquidity consumer when the transaction request from the at least one liquidity consumer remains unmatched with a liquidity offer in a liquidity pool within a time-out period, wherein the time-out period is selected by the liquidity consumer. The multicast mode of communication may operate a messaging protocol in which each message has fixed-length fields in binary format. The method may further include: assigning the range of transaction sizes upon receiving the data encoding the liquidity offers. Each liquidity pool comprises at least one liquidity offer at an offered transaction price and at the corresponding transaction.

The details of one or more embodiments of the subject matter described in this specification are set forth in the accompanying drawings and the description below. Other potential aspects, features, and advantages will be apparent from the description, the drawings, and the claims.

BRIEF DESCRIPTION OF THE DRAWINGS

FIG. 4B is an example diagram of an order book according to some implementations of the present disclosure.

DETAILED DESCRIPTION

Figure 1:
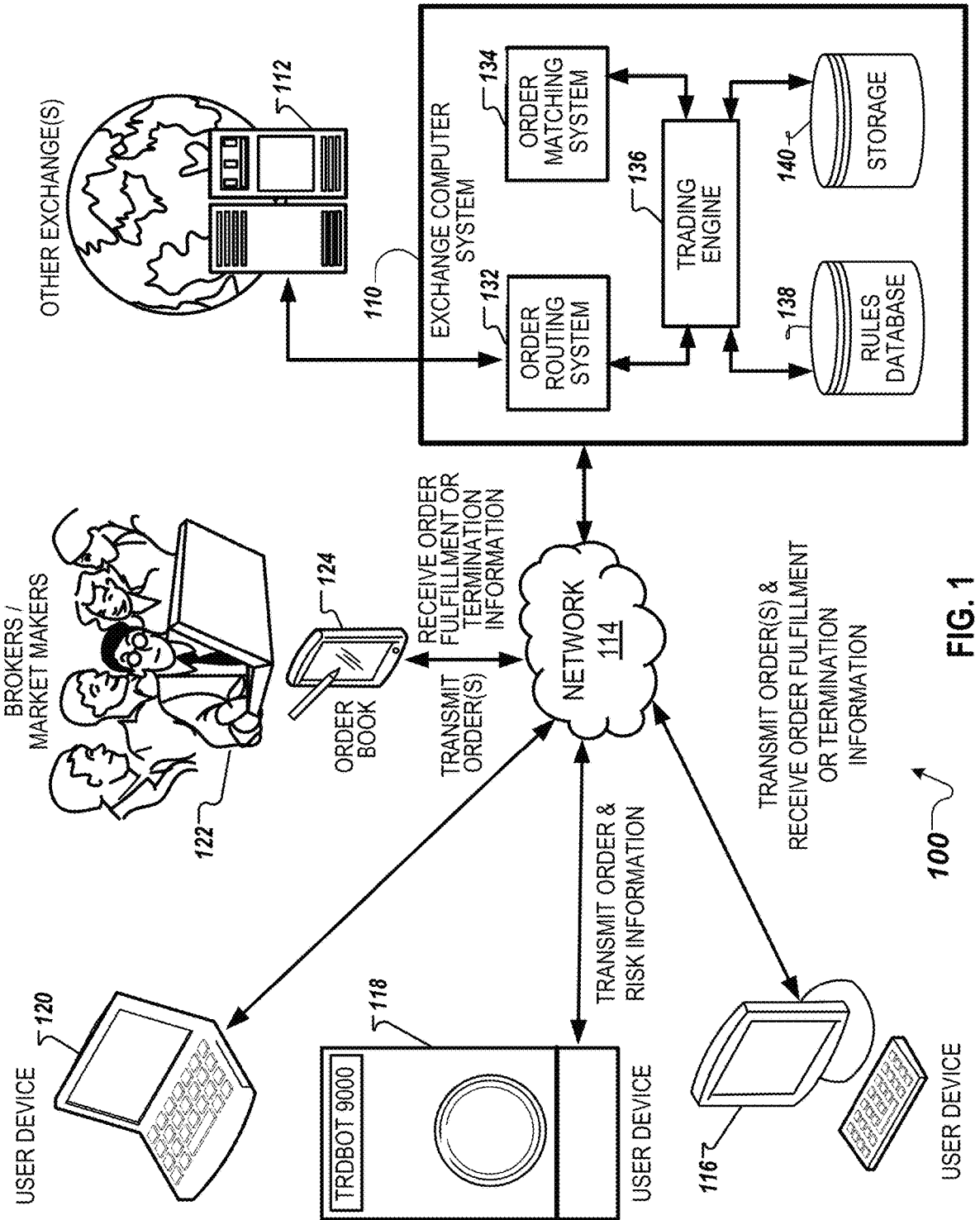
FIG. 1 is an example diagram of an exchange computer system and associated networks, devices, and users.

FIG. 1 is a diagram of an exemplary trading environment 100 for providing multicast access to participants on an exchange computer system for full-amount matching and execution. Generally, the term "user" may refer to any entity that interacts with the exchange computer system and/or associated networks and devices. Users may include, for example, market makers and other market professionals, brokers, institutional traders, individual traders, and automated trading systems. The term "liquidity provider" may refer to an entity with the capacity of providing liquidity in the trading environment 100. The term "liquidity consumer" may refer to another entity (e.g., broker or individual user) bidding for available liquidity in the trading environment 100. The term "liquidity" may refer to any liquid assets (e.g., financial instrument) being traded in the trading environment 100. The diagram may include an exchange computer system 110, other exchanges 112, a network 114, user devices 116, 118, 120, market makers/brokers 122, and electronic order book 124.

The exchange computer system 110 may be implemented in a fully electronic manner, or in a hybrid manner that combines electronic trading with aspects of traditional open-outcry systems. The exchange computer system 110 may receive orders for trading financial instruments locally on the floor and from remote electronic devices. The financial instruments may include securities such as treasury notes or bonds, stocks, options, futures contracts, or other derivatives associated with an underlying asset.

Network 114 connects the various components within the trading environment to facilitate communications between those components. For example, network 114 can be configured to enable the exchange of electronic communications that include order and order fulfillment information between connected devices, such as an electronic order book 124 and the exchange computer system 110.

Network 114 may include one or more networks or subnetworks, each of which may include a wired or wireless data pathway. Network 114 may, for example, include one or more of the Internet, Wide Area Networks (WANs), Local Area Networks (LANs), or other packet-switched or circuit-switched data networks that are capable of carrying electronic communications (e.g., data or voice communications).

To protect communications between the various systems, devices, and components connected to network 114, network 114 may implement security protocols and measures such that data identifying order or bid information, or parties placing orders or quotes, may be securely transmitted. Network 114 may, for example, include virtual private networks (VPNs) or other networks that enable secure connections to be established with exchange computer system 110.

User devices 116, 118, and 120 may include portable or stationary electronic devices, such as smartphones, laptops, desktops, and servers that include user interfaces to display information and receive user input, and that are configured to communicate over a computer network. User devices 116, 118, and 120 may communicate with the exchange computer system 110 over network 114 using a proprietary protocol, or a message-based protocol such as financial information exchange (FIX) implemented over TCP/IP.

For example, various implementations may leverage a messaging protocol such as the FIX (Financial Information exchange) protocol, which an electronic messaging protocol used by financial institutions to facilitate electronic communication for trading and other activities in the financial markets. The protocol defines a set of rules and guidelines for exchanging real-time market data, trading instructions, and other financial information between different parties. FIX messages may be sent in a specific format, which includes a message header, body, and trailer. The header contains information about the sender and receiver, while the body contains the actual message data. The trailer includes a checksum to ensure the message's integrity. The typical range of volume of FIX messages on a high-speed exchange network can vary widely depending on a number of factors, such as the type of trading activity, the number of participants, and the level of market volatility. However, in many cases, a high-speed exchange network can operate to process millions of FIX messages per second during peak trading periods. Indeed, operating FIX protocol on high-speed exchange networks can achieve low latencies in the range of microseconds or nanoseconds to allow market participants to execute trades quickly and efficiently in rapidly changing market conditions. As trading activity and market complexity continue to grow, exchange networks and market participants are continually working to optimize FIX messaging systems and protocols to support even higher volumes of data and faster processing speeds.

While the FIX protocol uses a text-based tag-value format, the implementations can also operate binary format messages with fixed-length fields tailored to the specific needs of communication and market data dissemination. For example, information technology exchange (ITCH) protocols use binary format messages with fixed-length fields to further reduce communication latency and increase communication throughout.

User devices 116, 118, and 120 may transmit user input such as order information or risk information to the exchange computer system 110, and may also receive data from the exchange computer system 110 indicating that an order has been filled or canceled.

Users such as brokers/market makers 122 may also place orders and receive information about order fulfillment or termination through electronic order book 124, which may include a record of outstanding public customer limit orders that can be matched against future incoming orders.

The exchange computer system 110 includes an order routing system (ORS) 132, an order matching system (OMS) 134, a trading engine 136, a database of trading rules and algorithms 138, and storage 140. In some implementations, the exchange computer system 110 is a distributed computer system.

The order routing system (ORS) 132 determines whether a received order or quote is to be executed at the exchange computer system 110, or should instead be redirected to another exchange 112, and may include processing systems that enable the management of high data volumes. The ORS 132 may, for example, receive order or quote information for the purchase or sale of financial instruments from one or more user devices 116, 118, 120, and 124. In some implementations, the ORS 132 may also be connected to or include a touch-screen order routing and execution system accessible by brokers on the exchange floor, such as a public automated routing (PAR) system.

Upon receiving an order or quote, the ORS 132 determines if the destination specified in the received order or quote is the exchange computer system 110. If the exchange computer system 110 is not the destination, the ORS 132 forwards the order or quote to another exchange 112, which may be either the destination exchange, or an exchange en route to the destination exchange. If the ORS 132 determines that the exchange computer system 110 is the destination of the received order or quote, the ORS 132 may forward the received order or quote to the order matching system 134.

The order matching system (OMS) 134 may include processing systems that analyze and manipulate orders according to matching rules stored in the database 138. The OMS 134 may also include an electronic book (EBOOK) of orders and quotes with which incoming orders to buy or sell are matched, according to the matching rules. The EBOOK may also be implemented in a separate database such as storage 140, which may include multiple mass storage memory devices for the storage of order and quote information. When the OMS 134 determines that a match exists for an order (for example, when a bid matches an offer for sale), the order matching system 134 may mark the matched order or quote with a broker-specific identifier so that the broker sending the order or quote information can be identified.

The trading engine 136 may be implemented using a combination of software and hardware. The trading engine 136 may, for example, be implemented as one or more hardware processors configured to execute one or more algorithms, as described in further detail below. An example configuration of an exchange computer system featuring a trading engine 136 is further described in FIG. 2.

The trading engine 136 may provide multicast capability between a selected set of liquidity providers and one or more liquidity consumer so that full-amount matching and execution can be achieved by following processes further described, for example, with respect to FIGS. 3, 4, 5, and 6.

For example, as a component of exchange computer system 110, trading engine 136 may filter the received liquidity quotes from liquidity providers so that only the top-of-the-book liquidity quotes in the liquidity pools are streamed user devices 116, 118, and 120. The streaming is implemented using a multicast mode of communication. Because the filtering effectively reduces the size of the data used for multicast communication, the implementations can improve communication efficiency. Moreover, trading engine 136, in addition to filtering out non top-of-the-book liquidity quotes, can operate a messaging protocol in which payload data is arranged in binary format with data fields in fixed length so that communication overhead can be further reduced.

The exchange computer system 110 can also facilitate executing the full amount of each order (i.e., transaction request) placed from user devices 116, 118, and 120. As further explained in association with FIG. 4A, the implementations allow each order configured with a minimum fill amount equivalent to the full amount of the order. By virtue of this configuration, each order can be matched in full against a single quote. Once a match has been identified, the order can be executed in full in one transaction. In the implementations, each order may also be configured with a time-out period so that, in case a match is not found within the time-out period, the order is dropped.

The electronic order book 124 may be a trade at settlement order book and the determined transaction price of the order from the received data is based on a daily settlement price. In some implementations, the electronic order book 124 may be a mark-to-model order book and the determined transaction price of the order from the received data is based on a daily settlement price determined by one or more financial models. For example, the daily settlement price may be provided by a financial model when a market for the underlying asset is not available, e.g., for complex financial instruments. In some implementations, the daily settlement price may be determined from a non-total return forward curve with a known expected dividend return.

The order from the received data may be a market order. In some implementations, other types of derivative contracts (e.g., forwards, swaps, and options) may be traded. In some implementations, a user may receive settlement by transferring the underlying asset to the user. In other implementations, the user may receive a cash-value settlement.

In some implementations, the exchange computer system 110 is a distributed computer system that includes an order entry port (e.g., by network 114), an order routing system (e.g., ORS 132), an order matching system (e.g., OMS 134), and a trading engine (e.g., trading engine 136). The distributed computer system may operate multiple hardware and software processes in parallel configurations. The order entry port receives the order from the data sent to the exchange computer system by a user device and the order routing system is configured to route the order to a destination associated with the order. As an example, the destination may include other exchanges 112, based on matching rules stored on database 138 and the configuration of the order matching system to match the order to the destination in the other exchanges 112.

Storage 140 and database 138 store and handle data in a manner that satisfies the privacy and security requirements of the exchange computer system 110 and its users, and may store one or more of telemetric data, user profiles, user history, and rules and algorithms for matching quotes, bids, and orders.

Upon completion of a trade (through the floor in open outcry as entered into the PAR system, or through automatic execution through the OMS 134 and auction engine 136), the fill information is passed through the OMS 134 and the ORS 132 to one or more user devices 116, 118, 120, and 124, and to the trading engine 136. The trading engine 136 matches the buy side and sell side of a trade, and forwards the matched trade to a third-party organization that verifies the proper clearance of the trade, such as the Options Clearing Corporation (OCC) where the securities may be options, or Depository Trust Company (DTC) where the securities may be equities. The OMS 134 also formats the quote and sale update information and sends that information through an internal distribution system that refreshes display screens on the floor, in addition to submitting the information to a quote and trade dissemination service such as, in the case of options, the Options Price Reporting Authority (OPRA). In the case of Equities, the information would be submitted to the Securities Information Processor (SIP).

Figure 2:
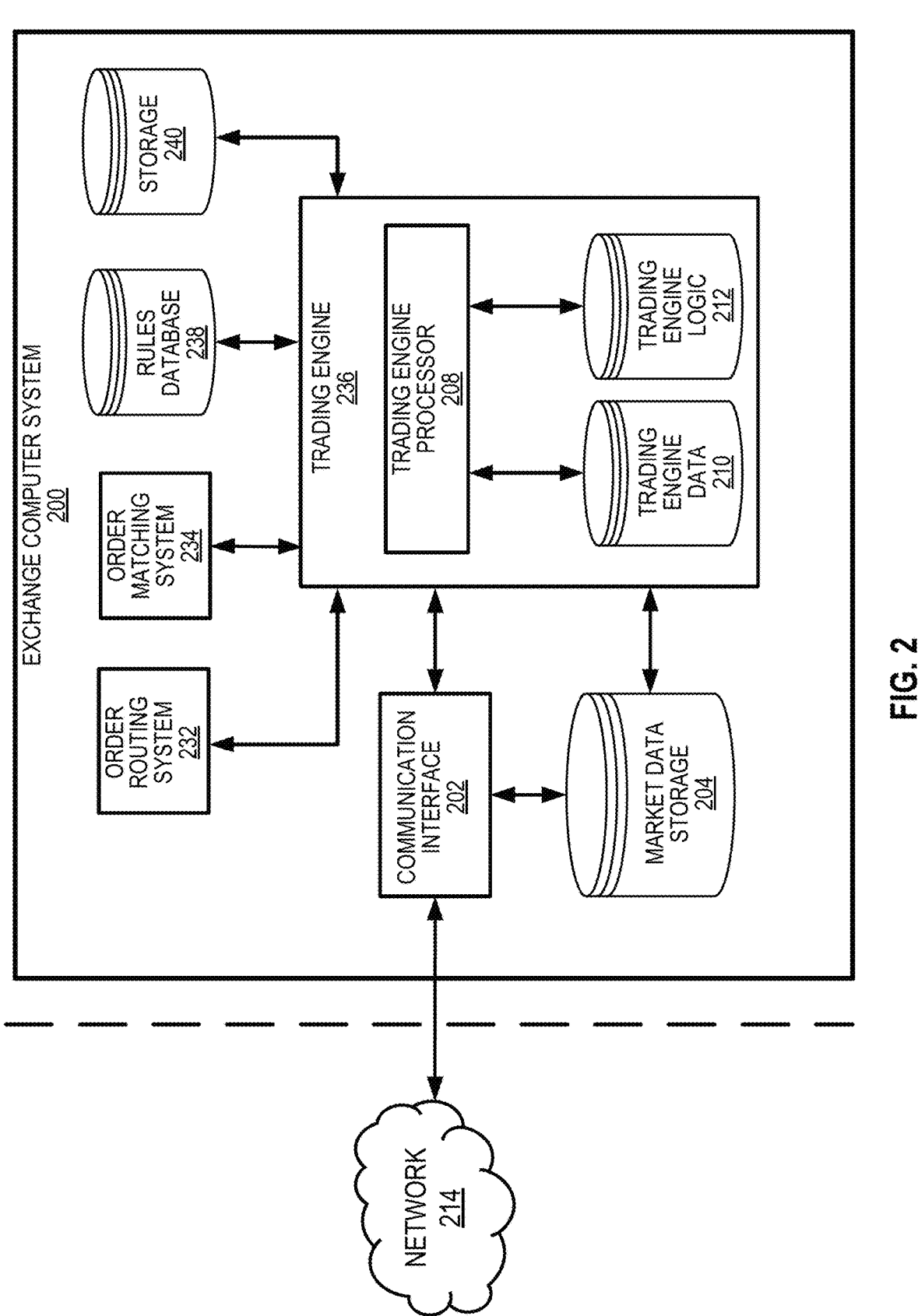
FIG. 2 is an example diagram of an exchange computer system including a trading engine.

FIG. 2 is a diagram of an example exchange computer system 200 with a trading engine 236 configured to generate, trade, and settle liquidities. The exchange computer system 200 may be implemented by software, hardware, or some combination as described herein. As an example, the exchange computer system 200 may be implemented as a server, a computer, or other device or processing component using proprietary software designed and implemented to achieve the functionality described herein. The exchange computer system 200 may be distributed or subdivided between a plurality of entities e.g., multiple computing devices.

The exchange computer system 200 may include a communication interface 202, coupled with a market data storage 204. The communication interface 202 may be communicatively linked to a trading engine 236, which includes a trading engine processor 208, trading engine data 210, and trading engine logic 212. The trading engine 236 may also be communicatively linked to an ordering matching system 234, an order routing system 232, a rules database 238, and storage 240 of the exchange computer system 200. The communication links in the exchange computer system 200 may be established by a system bus, network, or one or more other connection mechanisms. As an example, the connection mechanisms may include a wired connection, a wireless connection, or a combination thereof. For example, the connection may be a physical connection, such as a wired Ethernet connection. In another example, the connection may be a wireless connection, such as a cellular telephone network, an 802.11, 802.16, 802.20 controls or components, a WiMax network, or any other type of network. Further, network 214 may be a public network, such as the Internet, a private network, such as an intranet, or combinations thereof, and may utilize a variety of networking protocols now available or later developed including, but not limited to TCP/IP based networking protocols.

The trading engine processor 208 may include one or more processors, such as general-purpose processors (e.g., a microprocessor), special-purpose processors (e.g., an application-specific integrated circuit (ASIC) or digital-signal processor (DSP), programmable-logic devices (e.g., a field programmable gate array (FPGA)), or any other processor components now known or later developed. The trading engine processor 208 may carry out one or more instructions using one or more arithmetic, logical, and/or input/output operations. Though trading engine processor 208 is illustrated as a single component, trading engine processor 208 may be integrated in whole or in part with other components of the exchange computer system 200.

Data storage e.g., market data storage 204 and trading engine data 210, may be a main memory, a static memory, or a dynamic memory. Market data storage 204 and storage for trading engine data 210 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media, organic storage components, and the like. As an example, market data storage 204 and storage for trading engine data 210 may include a cache or random access memory for the trading engine processor 208. Market data storage 204 and storage for trading engine data 210 may be separate from the trading engine processor 208, such as a cache memory of a processor, the system memory, or other memory. Market data storage 204 and storage for trading engine data 210 may be an external storage device or database for storing data. Examples may include a hard drive, compact disc ("CD"), digital video disc ("DVD"), memory card, memory stick, universal serial bus ("USB") memory device, or any other device operative to store data.

As further shown, the trading engine 236 may include trading engine data 210 and/or trading engine logic 212. The trading engine data 210 may include one or more types of data suitable for a given implementation. For example, trading engine data 210 may include data (such as input datasets) that may be stored in memory. Trading engine logic 212 may include, for example, machine language instructions executable by trading engine 236 to carry out various functions, such as the functionality of the methods and systems described herein. In some implementations, the functions, acts or tasks may be independent of the particular type of instructions sets, storage media, processor or processing strategy and may be performed by software, hardware, integrated circuits, firm-ware, micro-code and the like, operating alone or in combination. Processing strategies may include multiprocessing, multitasking, parallel processing and the like.

In the exchange computer system 200, the communication interface 202 may include one or more structures, and associated equipment, for receiving data from one or more sources and distributing data to a group of one or more destinations. In some implementations, the communication interface 202 may include one or more additional communication interfaces and can operate in different configurations (e.g., distributed system, parallel). The communication interface 202 may be configured to receive input datasets from one or more entities (e.g., user devices or other exchanges) and store all or part of the input datasets in market data storage 204. The communication interface 202 may also be configured to communicate all or part of the input datasets to the trading engine 236 once the input datasets are stored or otherwise processed. The communication interface 202 may include a transceiver having one or more input/output ports connected to the network 214 to securely transmit data from the trading engine 236 to user computing devices.

As an example, the input datasets are stored in market data storage 204 may be partitioned (e.g., horizontal, vertical, functional) into designated memory locations (e.g., virtual addresses) based on qualities of the input datasets, and a type of underlying asset. In some implementations, input datasets with data related to component stock options may be stored in market data storage 204 and include a linking identifier (e.g., address, memory mapping) to identify a corresponding stock for each of the component stock options. In some implementations, the market data storage 204 may be configured to receive an indicator describing the operating status (e.g., receiving, clearing, storing) of input datasets of the communication interface 202.

The input datasets from the communication interface 202 may include financial market data (e.g., market intelligence) corresponding to the underlying asset. For example, financial market data may include volatilities, interest rates, dividends, returns (e.g., historical, expected), market capitalization, sector, prices (e.g., bid and ask), liquidity, and other metrics related to the underlying asset. Financial market data may also include measures, estimates, and other related data for options (e.g., calls, puts), futures, and other derivatives. The input datasets may also include corresponding log files to describe and store the financial market data. The log files may include metadata to tag or characterize data, e.g., corresponding time periods for which the data was recorded. For example, the log files may include a tag for sorting or filtering the data of the log files.

Upon receiving input datasets from the communication interface 202, including data stored in the market data storage 204, the trading engine 236 may perform further processes including receiving requests and accessing meta-data. The trading engine 236 may perform operations using the trading engine processor 208, with instructions stored in the trading engine logic 212, and data stored in trading engine data 210. The data stored in trading engine data 210 may include all of or a subset (e.g., filtered) of the data stored in market data storage 204, where the subset of the data stored in the trading engine data 210 is filtered based on a specified time period. The trading engine 236 may perform operations on the trading engine data 210 including deleting, archiving, tagging, and resetting. The trading engine 236 can utilize metadata, including log files, to process (e.g., filtering, sorting) the trading engine data 210.

The trading engine 236 may also access other components of the exchange computer system 200 including the order matching system 234, order routing system 232, rules database 238, and storage 240. The order matching system 234 may be configured to match an order received from the user device (e.g. user devices 116, 118, and 120) to another order based on the matching rules stored in the rules database 238. The order routing system 232 may be configured to route the order received from the user device to a destination associated with the order. The storage 240 may include additional data from the exchange computer system 200, accessed by the trading engine 236 for processing.

As noted above, the exchange computer system 110 can securely transmit information based on data received over successive periods of time to connected user computing devices (e.g., user devices 116, 118, 120) that are themselves configured to display the information. The information may be displayed, for example, within a graphical user interface of an application that facilitates continuous real-time visualization, trading, and settlement through the exchange computer system.

Figure 3:
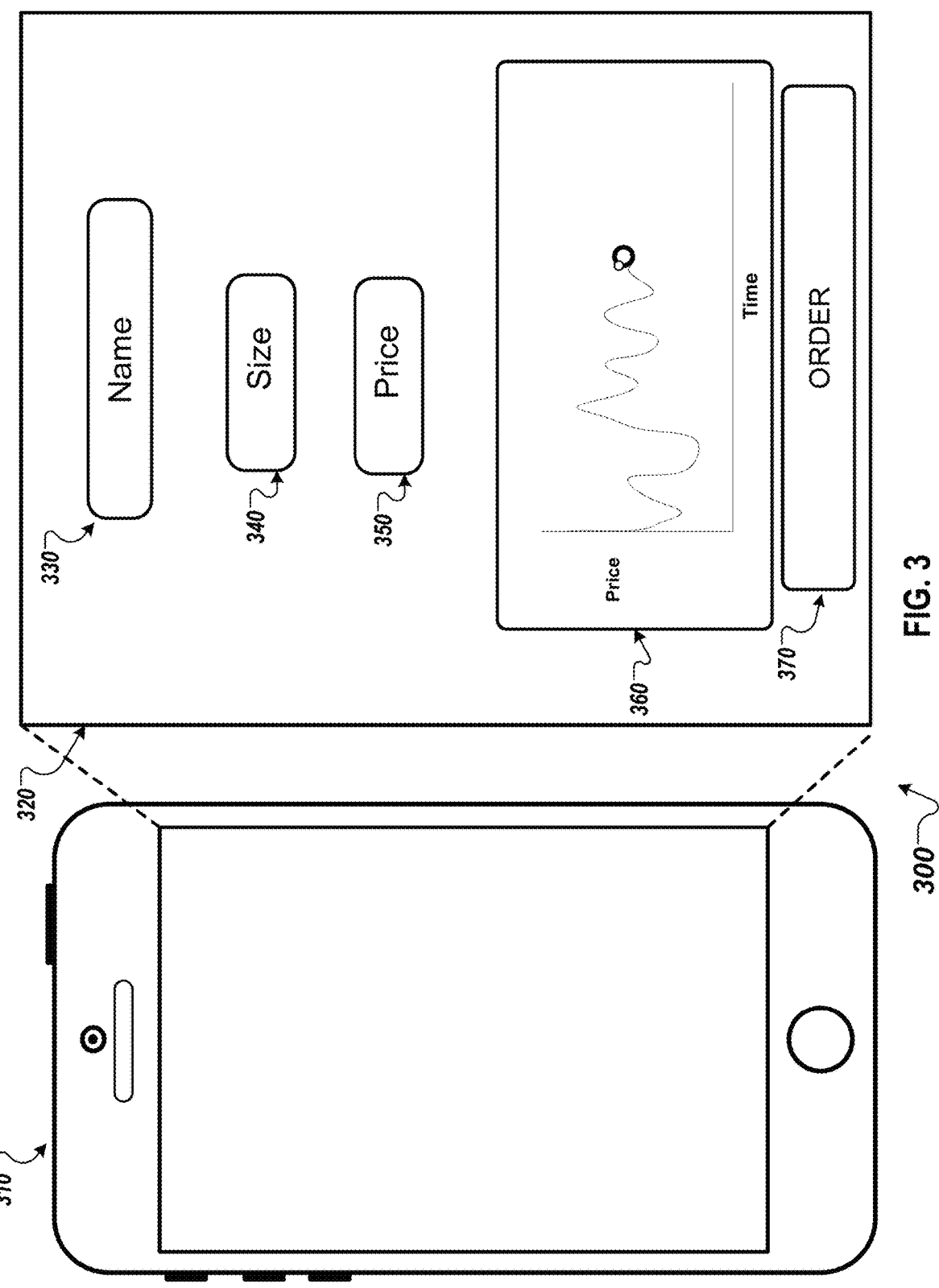
FIG. 3 is an illustration of an exemplary graphical user interface according to some implementations of the present disclosure.

FIG. 3 is an illustration of an exemplary graphical user interface on a device 310 for obtaining providing guidance to a user device regarding current market conditions on the electronic exchange network. A client device (e.g., user devices 116, 118, and 120) can, for example, display the graphical user interface for the user to monitor quotes from the liquidity pools that change minute by minute. For example, the top-of the-book prices of each liquidity pool may be streamed so that the ticker price are listed. A user of a device 310 can interact with a user interface panel 320 created on the device 310 after receiving data (e.g., trading engine data 210) from the exchange computer system by a computer network (e.g., network 214). The user interface panel 320 can include fields that enable a user to select, e.g., a name of the instrument 330, a transaction size (e.g., bid size) 340, a transaction price (e.g., bid price) 350. The user may additionally select other parameters, for example, time-out period. As noted above, implementations provide a full-amount-style matching protocol in which all placed orders sent to the trading engine have a minimum fill size equivalent to the full notional amount of the order being placed. In other words, the orders are only matched at a size equivalent to the full-amount of each order (also known as aggressing order). The time-out period define a period of time when a matching quote needs to be located. If no matching quote is identified within the time-out period, the order may be dropped by the trading engine. The dropping can take place when the order has been cancelled or expired. The implementations may allow the user (e.g., the liquidity consumer) to define the time-out period. The implementations may also allow the user (e.g., the liquidity consumer) to cancel the order (e.g., within the time-out period). A rolling curve of the price (e.g., top-of-the-book price in the liquidity pool from liquidity providers) can be displayed in area 360, as the information is streamed to the user-computing device. The rolling curve can be presented as the top-of-the-book prices is updated, or time elapses, so that the curve is extending in time horizon. Panel 370 may allow a participant to place an order for a transaction request specifying the desired instrument, transaction size, transaction price, and other parameters (such as a time-out period).

Figure 4A:
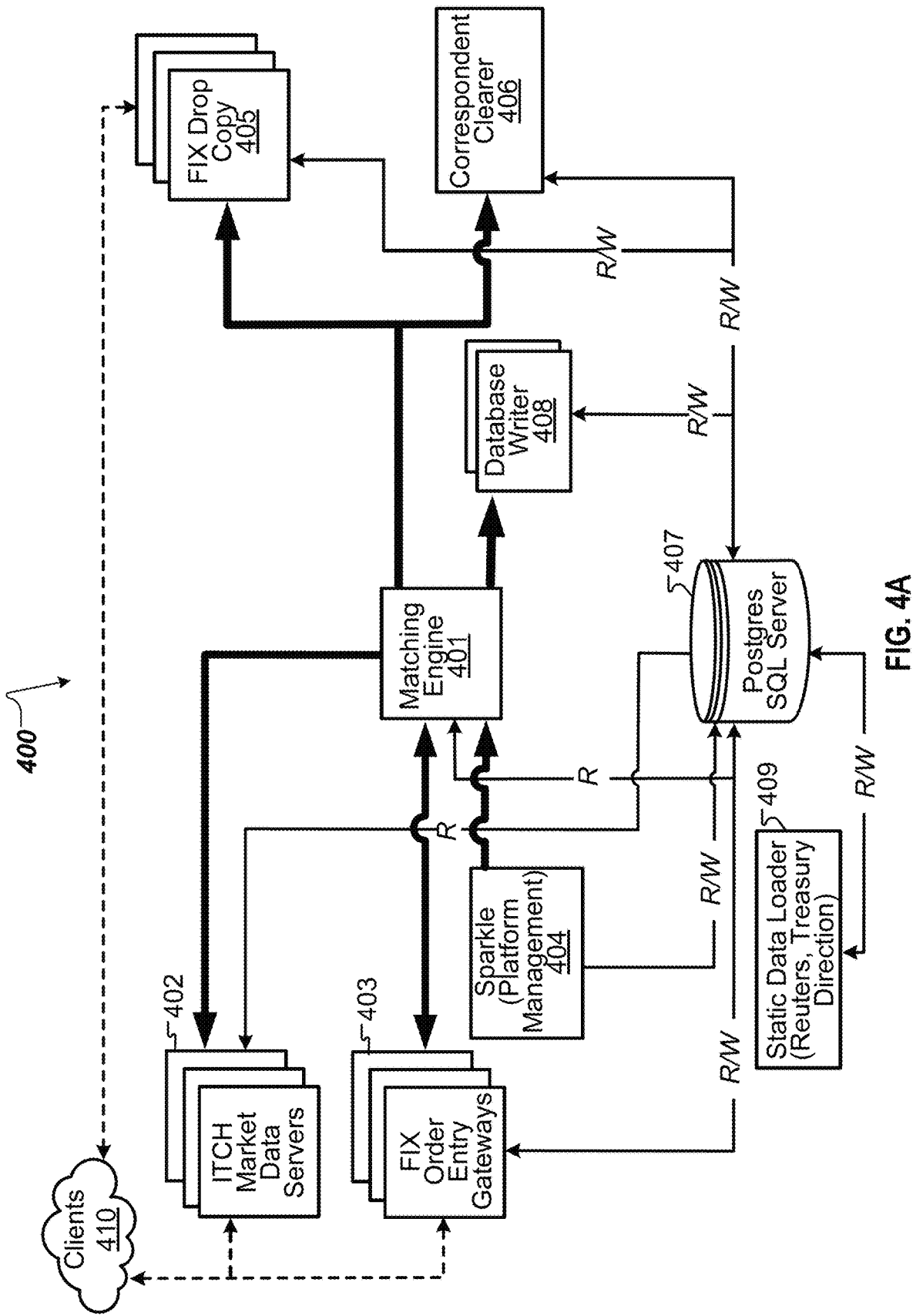
FIG. 4A is a diagram of a computer network architecture according to some implementations of the present disclosure.

FIG. 4A is a diagram 400 of a computer network architecture according to some implementations of the present disclosure. The computer network architecture can provide an electronic trading platform for fixed income products such as On-The-Run US treasury notes and bonds. On-the-Run Treasuries generally refer to the current issues from the US Treasury-between the auction by the US Treasury until the US Treasury auctions the next issue with the same duration. At a given time, there can be only one issue of a duration considered On-the-Run. US Treasuries are traded with size in terms of currency (USD) and price in terms of rates. In some implementations, prices can be expressed as a percentage of face value (also known as PAR value). Prices can be in decimal format rather than in multiples of 1/32 or 1/256. The decimal values can be restricted to increments of these fractions. Trading of US treasuries are generated reported to regulating agencies and can be handled by a central counterparty clearinghouse (CCP). In diagram 400, bold black lines indicate message transport on messaging buses tailored for the nascent applications of the present disclosure. Large dashed lines indicate client connectivity to system components of the network architecture. Thin solid lines indicate database connectivity system components and database (e.g., read and write accesses). In diagram 300, system components that run with multiple instances are indicated by a stack of square shapes on top of each other.

Clients 410 may include liquidity providers (LPs) that submit quotes for available liquidities (e.g., treasury notes, bonds, or other fixed income products). Clients 410 may also include liquidity consumers (LCs) that bids on available liquidities (e.g., fixed income products). LCs can include brokerage firms housing non-dealer customers (e.g., individual users). Each client is associated with one or more computing devices in connection with the computer network architecture of diagram 400. For example, an LP can have an associated computing device for feeding quotes for available liquidities (e.g., newly released treasuries), e.g., through FIX order entry gateways 403. A LC can have an associated user-computing device for placing orders (e.g., bids for the available liquidities) through FIX order entry gateways 403. As illustrated, FIX order entry gateways 403 can have multiple instances. Each instance can be a thread spawned by the electronic trading platform in response to an incoming message from a computing device of a client.

The FIX order entry gateways 403 may interact with a database (e.g., Postgres SQL server 407). In some cases, Postgres SQL server 407 can log quotes for available liquidities and bids for the available liquidities, as the information arrives at the FIX order entry gateways 403. Postgres SQL server 407 may also static data loader 409 to obtain static data, e.g., announcements made by news agencies such as REUTERS, and treasury outlets, such as TREASURY DIRECT. The entry and maintenance of Postgres SQL server 407 are conducted to allow for ACID (also known as Atomicity, Consistency, Isolation, and Durability) data transaction. For example, each database transaction (to read, write, update or delete data) is treated as a single unit so that either the transaction is executed in full, or none is executed. This property prevents data loss and corruption from occurring if, for example, if the streaming data source fails mid-stream. Moreover, the transactions only make changes to tables storing data entries in predefined manner so that corruption or errors in data do not create unintended consequences for the integrity of the table. When multiple users are reading and writing from the same table all at once, isolations are provided so that the concurrent transactions may not interfere with or affect one another. Each transaction is committed in time so that even in case of system failure, executed transactions are saved and can be recovered.

Postgres SQL server 407 may provide read/write access to platform management module 404. Postgres SQL server 407 may additionally provide read access to ITCH market data servers 402 and matching engine 401. Platform management module 404 may maintain and curate a series of distinct liquidity pools such that each Liquidity Consumer ("LC") will only receive and access quotes streamed by a unique subset of Liquidity Providers ("LPs") using a multicast communication session. For example, a distinct liquidity pool can be created for each notional size of liquidity offering, which can be received from one of several liquidity providers through the multicast communication session. Each liquidity pool can be implemented using the data structure of a queue so that an incoming liquidity offering of a particular size can be enqueued into the queue for the particular size. When a liquidity offer is taken, the liquidity offer can be dequeued from the queue. The trading engine may assign the range of transaction sizes upon receiving the data encoding the liquidity offers. Each liquidity pool may include at least one liquidity offer at an offered transaction price and at the corresponding transaction.

This multicast feature of providing distinct liquidity pools stands in sharp contrast to an 'all-to-all' order book where any one user may interact with all other users as potential trading counterparties. Moreover, the multicast feature has the following specific adaptations to provide efficient integration on the computer network.

First, the distinct liquidity pools are arranged in each notional size provided by the LPs. By way of background, the quotes for the fixed income product (e.g., newly released US treasuries) may come in certain pre-determined notional size tiers, for example, in intervals of 5-to-10 million, up to 100 million or so. The implementations of the present disclosure can sort quotes for each UST security in each notional size tier according to quote price, and time priority.

Second, using the multicast feature, the implementations projects only the top-book bid/ask from each LP in a respective liquidity pool to each LC. For example, if there are 3 bids of 5M notional size, at prices levels 10, 9, and 8, then only the best bid (i.e., priced at 10) at this notional size will be quoted in the data stream provided to each LC. In more general terms, for each notional size quoted, only the top-of-book pricing is shown. To illustrate, an LC may see the best bid in 5M size from a first LP (e.g., LP A), best offer in 5M size from a second LP (e.g., LP B), best bid in 10M size from a third LP (e.g., LP C) and best offer in 10M side from LP C. By streaming only the top-of-book pricing in the multicast communication session, the implementations can effective reduce communication overhead while preserving quality of communication.

Third, the messaging protocols are optimized for the multicast communication session. For example, the implementations may use a binary protocol for efficient market data dissemination, e.g., over the bold black lines in diagram 400 between platform management module 404, matching engine 401, and ITCH market data servers 402. By way of illustration, ITCH stands for "Information Technology Change," and is a specialized messaging protocol used by some financial institutions. The ITCH messaging protocol is representative, but the implementations are not so limited. In fact, the implementations can use other binary messaging protocol with fixed field lengths to drive the multicast communication session with ultra-low latency. Each binary message may include a series of fields, where each field represents a specific data element. The field lengths are predefined and fixed, allowing for fast parsing and processing by the computer network architecture in diagram 400. In comparison, the FIX protocol uses a text-based tag-value format, and may not be as optimized to drive the multicast communication session as the binary messaging protocol (e.g., the ITCH protocol).

By way of illustration, examples of fields can include an instrument type, trading parameters, and an instrument. An instrument type can include a symbol, a description, a type (e.g., a bill (with a duration of one year or less), a note (with a duration of two years up to and including ten years), bonds (with a duration of greater than 10 years), a sub-type (e.g., On-the-Run, Off-The-Run, Issue time, and others). Trading parameters can include tick sizes (e.g., price increments to be disseminated on the market data feeds), notional tiers (e.g., transaction sizes), and allowable quantity increments. For example, an aggressing order can be of a size evenly divisible by the allowable quantity increment in order to be accepted. Otherwise, the aggressing order can be rejected. In some implementations, the value can be set to one dollar. An example of an instrument can include a unique identified known as CUSIP number, an auction date (e.g., the date the instrument auctioned by the US Treasury), series information (e.g., coupon information referring to the interest rate that the instrument pays, issue date referring to the date on which the instrument begins to accrue interest, and maturity date information referring to the date the instrument will mature and the principle is paid).

In addition to On-the-Run US treasuries, the platform also offers Off-the-Run US treasuries, and therefore can include a multitude of concurrent versions of a particular duration. For example, the platform can have a multitude of Two-Year Notes available for trading at any point in time, each one unique (e.g. different CUSIPs, Issue Dates, etc.). The platform may also offer spreads, which are tradeable instruments that include more than one other tradable instruments (also referred to as legs). One example is to Buy a Two-Year Note and Sell a Five-Year Note. In some cases, the spread can be traded as a single tradeable instrument priced in a rate differential, rather than a percent of face value.

In the above context, platform module 404 may maintain a unique book for each pool/session (i.e. "per instrument, per buy/sell side and per notional tier"). In more detail, it is the first time that a quote for a liquidity can be seen for "an instrument, on buy or sell side, on a notional tier", then a "New" event is generated so that a queue can be established for this specific pool or session. If the last quote for "an instrument, on buy or sell side, on a notional tier" is removed from the pool/session, then a "Cancel" event is generated so that the queue may be deactivated. If a market event causes a top-of-book change, then a "Modify" event is generated and ITCH data server 402 can stream the updated top-of-book price to LCs of clients 410. If a new price or cancel does not cause the top of book to change, then no event is generated (e.g., to preserve network bandwidth). In these cases, the ITCH market data are streamed in real-time to clients 401. The streaming does not require clients 410 to request, e.g., a Market Snapshot, before real-time data can be retrieved. Instead, upon logging on and subscribing to the available instruments, an LC from clients 401 can receive updates used to construct the current state of the book (e.g., on platform module 404), followed by a stream of real-time price updates as the order book changes. All quotes received by the platform can be displayed on an anonymous basis, with no user-specific identifying attributes.

Fourth, platform module 404 provides a full-amount-style matching protocol. By way of illustration, all aggressing orders sent to the platform by LCs have a minimum fill size equivalent to the full notional amount of the order. In other words, each order is matched at a size equivalent to the "Full Amount" of the aggressing order. As a result, each order submitted by a LC can only match and execute against a single quote from a single LP counterparty. In other words, an order from an LC cannot sweep the order book maintained by, e.g., platform module 404).

FIG. 4B is an example diagram of an order book according to some implementations of the present disclosure. For example, the diagram 450 depicts an example order book that shows offers in sizes of 1M, 3M, 5M, and 10M (implying a total of 19M offered), may only fulfill a max bid of 10M on the platform as described by the present disclosure. In comparison, a sweepable book can provide a total amount of 19M for fulfillment. In another example, an aggressing (also used interchangeably with aggressive) order can sell a liquidity at a size of 3M. As shown in FIG. 4B, this sell order can match against the 4M bid in the order book. This is because the 4M bid provides a better top-of-the book price than both the 3M and 5M levels. In this example, the 1M level provides the best price. However, the 1M level does not satisfy the aggressing order's size (i.e., 3M). In this example, once the aggressing order is matched, the 4M bid may be reduced 1M in size and hence may become a 1M bid.

In these examples, the aggressing orders sent to the platform will have an immediate execute or Cancel time-in-force with a limit price. In other words, an LC's aggressive order that fails to match with a quote (e.g. quote canceled and no longer available) will be dropped and will not be placed into the order book. On the platform, an LC can only remove liquidity, while an LP can only quote and never match against a resting order. Once a transaction is executed, the trade execution is not disseminated to other users on the platform (e.g., using market data streaming). The trade executions are, however, subject to reporting as required by relevant regulations.

Platform module 404 can curate each liquidity pool of the series of liquidity pool so that the streaming can be individually tailored to each user. The individualization can be based on a number of factors including, for example, (a) user-defined trading strategies or objectives; (b) user-defined counterparty preference; (c) user's access method (i.e., driven by application program interface (API) or manual); (d) historical market impact of the user (e.g., as an LC, or an LP); and (e) historical bid-offer spreads seen by the user. The API provides a programmable interface for a user application to communicate with the computer network architecture of diagram 400.

In these examples, matching engine 401 can match a transaction request from a LC with available liquidities provided by LPs. As illustrated, when a match has been identified, matching engine 401 may invoke database writer 408 to execute a transaction on Postgres SQL server 407. The thin solid lines connecting database writer 408 and Postgres SQL server 407 indicate read (R) and write (W) access. In cases where a transaction request is dropped (e.g., the LC cancels the order, or the order remain unfilled after the time-out period), matching engine 401 can trigger a FIX drop copy 405. In cases where the liquidity pool is dried up (e.g., the last liquidity offer has been matched and taken), match engine 401 may trigger a correspondent clearer 406 so that the corresponding queue can be cleared. As illustrated, the thin solid lines connecting FIX drop copy 405 and correspondent clearer 406 with Postgres SQL server 407 indicate read (R) and write (W) access.

Figure 5:
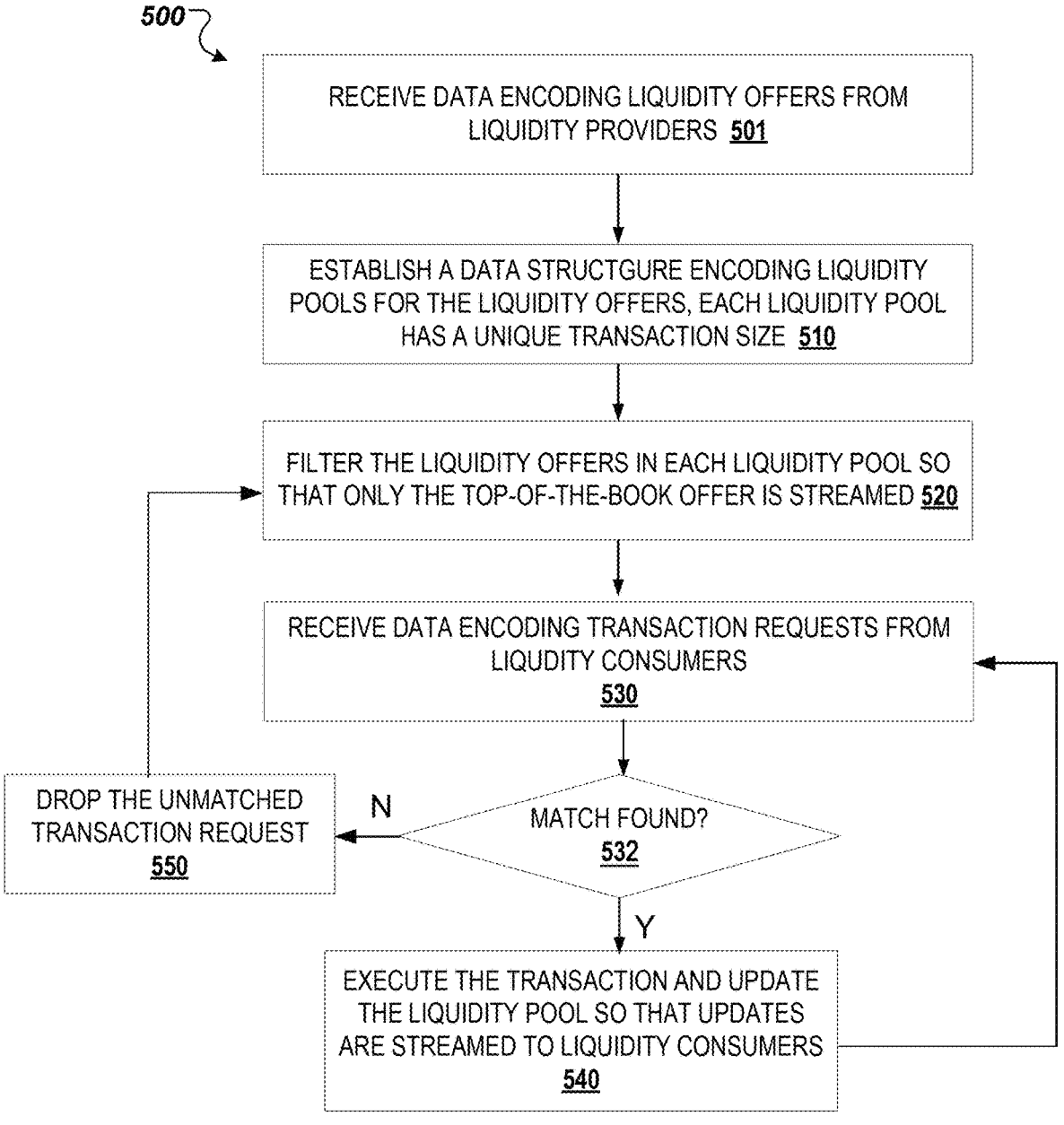
FIG. 5 is a flowchart of an example process according to some implementations of the present disclosure.

Further referring to flow chart 500 of FIG. 5, an example of a process can receive (e.g., continuously on a platform illustrated in FIGS. 1-2, and 4) data encoding liquidity offers from multiple liquidity providers (501). The liquidity providers can be provided in a range of sizes, for example, incrementally from a starting range of 1M to an ending range of 10M. The process may then establish a data structure encoding a series of distinct liquidity pools based on the received liquidity offers (510). For example, each of the liquidity pools may have a distinct size (e.g., transaction amount). In terms of a treasury product, the size can refer to a total number of treasury notes per offer. As detailed above (e.g., in association with FIG. 4A), a distinct pool can be maintained for each instrument, each notional size tier, and per buy/sell side (e.g., each treasury note offering with a size, per bid/ask).

For each liquidity pool, the process may filter the received liquidity offers from the liquidity providers so that only the top-of-the-book liquidity offer is streamed to liquidity consumers (520). Here, the top-of-the-book liquidity offer refers to the best offer in the liquidity pool. This best offer is streamed to liquidity providers so that the liquidity consumers can visualize the information in real-time (e.g., as each liquidity pool is being updated). Significantly, the streaming involves a multicast communication protocol so that input data from multiple liquidity providers are streamed to multiple liquidity consumers. As explained in more detail above in association with FIG. 4A, the multicast communication protocol can involve messaging using binary format with data fields of fixed length (e.g., pre-determined per protocol specification). The transmission and reception of binary messages with fields in fixed length can significantly reduce communication overhead (e.g., measured in latency and throughout).

The process may also receive data encoding transaction requests submitted by liquidity consumers (530). As illustrated in FIG. 3, a liquidity consumer may visualize the top-of-the-book offerings for each distinct liquidity pool and can place orders as the user deem fit. The placed orders represent transaction requests, each including a transaction price and a transaction size. The process may then match a transaction request with a transaction price and a transaction size with a liquidity offer in a pool that satisfies the size requirement (532). As explained above in association with FIG. 4A, the received orders are configured as aggressing orders (or aggressive orders) in which the minimum fill size of each order is equivalent to the full notional amount of the order. Each order submitted by a LC can only match and execute against a single quote from a single LP counterparty. This single-matching feature can additionally improve the efficiency of identifying matches and executing transactions.

In response to identifying a match, the process may execute the transaction against the matching liquidity offer in a liquidity pool that satisfies the transaction size requirement (540). The process may then update the liquidity pool so that data from the updated liquidity pool can be streamed to liquidity consumers using the multicast communication protocol as explained above. In some cases, the update may involve more than one liquidity pools. As explained above in association with FIG. 4B, the process may identify a matching liquidity offer in the pool of 4M (size). When the transaction for a 3M order is executed, the matching liquidity offer may become 1M in size and then relocate to the liquidity pool of 1M. In various implementations, updated top-of-the-book offerings from the active pools can be streamed to each liquidity consumer. In response to a particular transaction request being unmatchable, the process may drop the unmatched transaction request after a time-out period (550). As explained above in association with FIG. 3, the time-out period can be selected by a user, e.g., a liquidity consumer. In some cases, the transaction request can be cancelled by the liquidity consumer. In the event of the cancellation, if the transaction request has not been matched, the process can also drop the transaction request. In other event, the process may return to receive additional data encoding transaction requests submitted by liquidity consumers (530), or additional data encoding liquidity offers from multiple liquidity providers (501).

Figure 6:
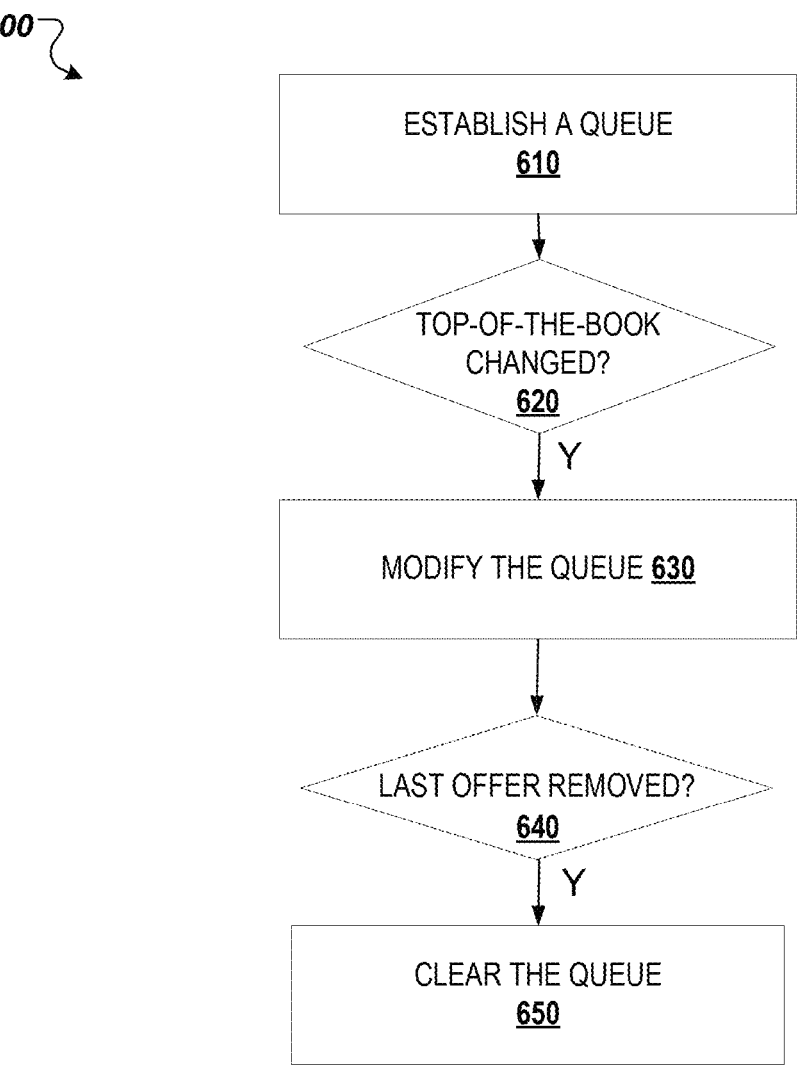
FIG. 6 is a flowchart of an example process according to some implementations of the present disclosure.

FIG. 6 shows another flow chart 600 according to some implementations of the present disclosure. In the context of setting up a data structure to encode the series of distinct liquidity pools, the process may establish a queue (610). For example, when a liquidity offer for "an instrument, on buy or sell side, on a notional tier" appears for the first time, then the process can establish a queue for the instruction on the particular size and at the notional size tier. In some cases, a "New" event is generated so that the queue can be established for this specific pool.

The process may determine whether the top-of-the-book offer in the queue representing the liquidity pool has changed. For example, when a transaction request is matched to a liquidity offer and the transaction has been executed, the top-of-the-book offer of the queue may change. In response to determining that the top-of-the-book offer of the queue has changed (620), the process may modify the queue (630) so that the updated information (e.g., new top-of-the-book offer of the queue) can be streamed to liquidity consumers using a multicast communication protocol, as explained in more detail above in association with FIG. 4A. When the top-of-the-book offer of the queue has not changed, the process may keep the queue unchanged (625).

The process may also determine whether the last liquidity offer of the queue has been removed. For example, transaction requests submitted by liquidity consumers may dry up the available liquidity offers in a liquidity pool. In response to the last liquidity offer being removed from the queue (640), the process may generate a "Cancel" event so that the queue may be cleared (650). When the last liquidity offer of the queue is still there, the queue may be kept (645).

A number of implementations have been described hereinabove. It should however be understood that various modifications may be made without departing from the spirit and scope of the disclosure. For example, various forms of the flows shown above may be used, with steps re-ordered, added, or removed. Accordingly, other implementations are within the scope of the disclosure and claims.

Embodiments and all of the functional operations and/or actions described in this specification may be implemented in digital electronic circuitry, or in computer software, firmware, or hardware, including the structures disclosed in this specification and their structural equivalents, or in combinations of one or more of them. Embodiments may be implemented as one or more computer program products, e.g., one or more modules of computer program instructions encoded on a computer readable medium for execution by, or to control the operation of, data processing apparatus. The computer readable medium may be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

Elements of a computer may include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer may not have such devices. Moreover, a computer may be embedded in another device, e.g., a tablet computer, a mobile telephone, a personal digital assistant (PDA), a mobile audio player, a Global Positioning System (GPS) receiver, to name just a few. Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT), liquid crystal display (LCD), or light emitting diode (LED) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while actions are depicted in the drawings in a particular order, this should not be understood as requiring that such actions be performed in the particular order shown or in sequential order, or that all illustrated actions be performed, to achieve desirable results. Moreover, the separation of various system components in the embodiments described above should not be understood as requiring such separation in all embodiments, and it should be understood that the described program components and systems may generally be integrated together in a single software product or packaged into multiple software products.

Thus, particular embodiments have been described. Other embodiments are within the scope of the following claims. For example, the actions recited in the claims may be performed in a different order and still achieve desirable results.

What is claimed is:

1. An exchange computer system comprising:

at least one hardware processor configured to perform operations comprising:

receiving data encoding liquidity offers from first computing devices associated with a plurality of liquidity providers, the liquidity offers having a range of transaction sizes;

generating a data structure encoding a series of liquidity pools for the liquidity offers from the first computing devices, wherein generating the data structure encoding the series of liquidity pools comprises assigning each liquidity pool to a corresponding transaction size from the range of transaction sizes;

configuring the exchange computer system to operate in a mode for multicast communication, the mode for multicast communication allowing simultaneous communication between the exchange computer system and second computing devices associated with at least one liquidity consumer using a multicast communication protocol between the second computing devices and the exchange computer system;

filtering, based on the corresponding transaction size for each liquidity pool, the liquidity offers in each liquidity pool to a top-of-the-book offer from among the liquidity offers in each liquidity pool;

streaming, to each of the second computing devices for the at least one liquidity consumer, the top-of-the-book offer for each of the liquidity pools using the multicast communication protocol;

receiving transaction requests from at least one computing device from the second computing devices associated with the at least one liquidity consumer, wherein each transaction request includes a transaction price and a transaction size;

determining, from the series of liquidity pools, a liquidity offer in a liquidity pool having a full notional amount of liquidity matching a first transaction request from the transaction requests from the at least one computing device;

in response to determining the first transaction request from the at least one computing device matches with the liquidity offer in a liquidity pool, generating an order for the liquidity offer in the liquidity pool, wherein the order is configured to execute the full notional amount of liquidity in the first transaction request using the liquidity offer, and wherein the order is configured to be canceled by the at least one hardware processor in response to a determination that the order is unexecuted;

executing the first transaction request using the order;

in response to executing the first transaction request using the order, updating the liquidity pool based on the transaction size of the first transaction request to remove the liquidity offer from the liquidity pool; and transmitting, using the multicast communication protocol, data related to the updated liquidity pool to the second computing devices.

2. The exchange computer system of claim 1, wherein generating the data structure comprises generating a plurality of queues each encoding liquidity offers of a respective transaction size, each queue in the plurality of queues configured to (i) store data representing an order book for the liquidity offers of the respective transaction size and (ii) stream updates to the liquidity offers of the respective transaction size.

3. The exchange computer system of claim 2, wherein the operations further comprising:

in response to receiving a liquidity offer of a particular transaction size and determining that a liquidity offer of the particular transaction size is absent from the liquidity offers in the plurality of queues, generating a particular queue for the particular transaction size; and storing the liquidity offer of the particular transaction size in the particular queue.

4. The exchange computer system of claim 2, wherein the operations further comprising:

in response to determining that a last liquidity offer for a particular transaction size is being removed from a particular liquidity pool among the series of liquidity pools, clearing a particular queue from the plurality of queues, wherein the particular queue is configured to store the last liquidity offer prior to removal of the last liquidity offer from the particular liquidity pool.

5. The exchange computer system of claim 2, wherein the operations further comprising:

detecting an update to a top-of-the-book offer in a particular queue associated with a particular liquidity pool among the series of liquidity pools; and in response to detecting the updated top-of-the-book offer in the particular queue, streaming, to each of the second computing devices for the at least one liquidity consumer, the updated top-of-the-book offer of the particular queue using the multicast communication protocol.

6. The exchange computer system of claim 1, wherein matching the first transaction request comprises:

comparing, from among a plurality of queues each corresponding to a liquidity pool from the series of liquidity pools, top-of-the-book offers for at least two queues from the plurality of queues, wherein executing the first transaction request against the liquidity offer in the liquidity pool using the order comprises executing the first transaction request in full without breaking up the first transaction request, and wherein the liquidity pool has a transaction size that is no smaller than the transaction size of the first transaction request.

7. The exchange computer system of claim 1, wherein the operations further comprising:

determining that a particular transaction request from a particular computing device from the second computing devices associated with a liquidity consumer remains unmatched with a liquidity offer within a time-out period, wherein the particular transaction request comprises an instruction selecting the time-out period and transmitted by the particular computing device to the exchange computer system; and in response to the determination, dropping the particular transaction request.

8. The exchange computer system of claim 1, wherein using the multicast communication protocol comprises:

transmitting, by the at least one hardware processor, payload data to each of the second computing devices, wherein the payload data comprises fixed-length fields representing data elements, and wherein the data elements of the fixed-length fields are arranged in a binary format.

9. The exchange computer system of claim 1, wherein the operations further comprising:

assigning the range of transaction sizes upon receiving the data encoding the liquidity offers.

10. The exchange computer system of claim 1, wherein each liquidity pool comprises at least one liquidity offer at an offered transaction price and at the corresponding transaction size.

11. A computer-implemented method performed by at least one hardware processor of an exchange computer system, the computer-implemented method comprising:

receiving data encoding liquidity offers from first computing devices associated with a plurality of liquidity providers, the liquidity offers having a range of transaction sizes;

generating a data structure encoding a series of liquidity pools for the liquidity offers from the first computing devices, wherein generating the data structure encoding the series of liquidity pools comprises assigning each liquidity pool to a corresponding transaction size from the range of transaction sizes;

configuring the exchange computer system to operate in a mode for multicast communication, the mode for multicast communication allowing simultaneous communication between the exchange computer system and second computing devices associated with at least one liquidity consumer using a multicast communication protocol between the second computing devices and the exchange computer system;

filtering, based on the corresponding transaction size for each liquidity pool, the liquidity offers in each liquidity pool to a top-of-the-book offer from among the liquidity offers in each liquidity pool;

streaming, to each of the second computing devices for the at least one liquidity consumer, the top-of-the-book offer for each of the liquidity pools using the multicast communication protocol;

receiving transaction requests from at least one computing device from the second computing devices associated with the at least one liquidity consumer, wherein each transaction request includes a transaction price and a transaction size;

determining, from the series of liquidity pools, a liquidity offer in a liquidity pool having a full notional amount of liquidity matching a first transaction request from the transaction requests from the at least one computing device;

in response to determining the first transaction request from the at least one computing device matches with the liquidity offer in a liquidity pool, generating an order for the liquidity offer in the liquidity pool, wherein the order is configured to execute the full notional amount of liquidity in the first transaction request using the liquidity offer, and wherein the order is configured to be canceled by the at least one hardware processor in response to a determination that the order is unexecuted;

executing the first transaction request using the order;

in response to executing the first transaction request using the order, updating the liquidity pool based on the transaction size of the first transaction request to remove the liquidity offer from the liquidity pool; and transmitting, using the multicast communication protocol, data related to the updated liquidity pool to the second computing devices.

12. The computer-implemented method of claim 11, wherein generating the data structure comprises generating a plurality of queues each encoding liquidity offers of a respective transaction size, each queue in the plurality of queues configured to (i) store data representing an order book for the liquidity offers of the respective transaction size and (ii) stream updates to the liquidity offers of the respective transaction size.

13. The computer-implemented method of claim 12, further comprising:

in response to receiving a liquidity offer of a particular transaction size and determining that a liquidity offer of the particular transaction size is absent from the liquidity offers in the plurality of queues, generating a particular queue for the particular transaction size; and storing the liquidity offer of the particular transaction size in the particular queue.

14. The computer-implemented method of claim 12, further comprising:

in response to determining that a last liquidity offer for a particular transaction size is being removed from a particular liquidity pool among the series of liquidity pools, clearing a particular queue from the plurality of queues, wherein the particular queue is configured to store the last liquidity offer prior to removal of the last liquidity offer from the particular liquidity pool.

15. The computer-implemented method of claim 12, further comprising:

detecting an update to a top-of-the-book offer in a particular queue associated with a particular liquidity pool among the series of liquidity pools; and in response to detecting the updated top-of-the-book offer in the particular queue, streaming, to each of the second computing devices for the at least one liquidity consumer, the updated top-of-the-book offer of the particular queue using the multicast communication protocol.

16. The computer-implemented method of claim 11, wherein matching the first transaction request comprises:

comparing, from among a plurality of queues each corresponding to a liquidity pool from the series of liquidity pools, top-of-the-book offers for at least two queues from the plurality of queues, wherein executing the first transaction request against the liquidity offer in the liquidity pool using the order comprises executing the first transaction request in full without breaking up the first transaction request, and wherein the liquidity pool has a transaction size that is no smaller than the transaction size of the first transaction request.

17. The computer-implemented method of claim 11, further comprise:

determining that a particular transaction request from a particular computing device from the second computing devices associated with a liquidity consumer remains unmatched with a liquidity offer within a time-out period, wherein the particular transaction request comprises an instruction selecting the time-out period and transmitted by the particular computing device to the exchange computer system; and in response to the determination, dropping the particular transaction request.

18. The computer-implemented method of claim 11, wherein using the multicast communication protocol comprises:

transmitting, by the at least one hardware processor, payload data to each of the second computing devices, wherein the payload data comprises fixed-length fields representing data elements, and wherein the data elements of the fixed-length fields are arranged in a binary format.

19. The computer-implemented method of claim 11, further comprising:

assigning the range of transaction sizes upon receiving the data encoding the liquidity offers.

20. The exchange computer system of claim 1, wherein the data related to the updated liquidity pool comprises order payload data related to the order that executed the first transaction request, wherein the order payload data comprises fields representing parameters of the order, and wherein the fields are arranged in a binary format.

* * * * *